United States Patent [19]

Mahnig et al.

[11] Patent Number: 4,627,667

[45] Date of Patent: Dec. 9, 1986

[54] VEHICLE SUSPENSION ASSEMBLY

[75] Inventors: Fritz Mahnig, Schaffhausen, Switzerland; Günter Schulte, Velbert, Fed. Rep. of Germany

[73] Assignee: Georg Fischer AG, Schaffhausen, Switzerland

[21] Appl. No.: 623,947

[22] Filed: Jun. 25, 1984

[30] Foreign Application Priority Data

Jun. 24, 1983 [CH] Switzerland .................. 3458/83

[51] Int. Cl.[4] .................. B60B 35/00; B60G 3/20
[52] U.S. Cl. .................. 301/126; 280/668; 403/313
[58] Field of Search .................. 301/126; 280/668; 403/110, 313, 362, 373, 375

[56] References Cited

U.S. PATENT DOCUMENTS 4,274,654 6/1981 Travaglio .................. 280/668
4,372,418 2/1983 Dangel .................. 280/668 X

FOREIGN PATENT DOCUMENTS 3246065 7/1983 Fed. Rep. of Germany ...... 280/668
2254238 7/1975 France .................. 403/313
2299982 9/1976 France .................. 280/668
23575 of 1899 United Kingdom .................. 403/313

Primary Examiner—David A. Scherbel
Attorney, Agent, or Firm—Marmorek, Guttman & Rubenstein

[57] ABSTRACT

There is disclosed a vehicle suspension unit in the form of a swivel bearing for an axle unit and comprising a wheel bearing assembly, a shock absorber leg connection and a hollow connecting element between the bearing housing and the shock absorber leg connection. The shock absorber leg connection comprises a substantially closed sleeve which receives the shock absorber leg, and a threaded fastener which extends transversely through the sleeve and, upon tightening, causes the sleeve to exert a clamping action around the shock absorber leg. The unit is formed as a one-piece casting, or from pressed sheet metal.

11 Claims, 2 Drawing Figures

VEHICLE SUSPENSION ASSEMBLY

BACKGROUND OF THE INVENTION

This invention relates to a vehicle suspension assembly in the form of a swivel bearing for an axle unit, which comprises a wheel bearing housing, a shock absorber leg connection and a hollow connecting element between the bearing housing and the shock absorber leg connection.

It is known to provide different constructions of swivel bearing in which rib, box and hollow profiles are used as the connecting element to the shock absorber leg connection. The shock absorber leg connection is constructed mainly in two ways. In one mode, there is provided a divided shock absorber leg connection, with a respective outer flange on each of the mating separated parts, which are used to receive a securing element. After the shock absorber leg has been inserted into the shock absorber leg connection, the two portions of the connections are screwed together. In another mode, there is provided a hollow shock absorber leg connection, which is pressed onto a tubular part of the shock absorber.

In the first known mode, the material used and the amount of processing treatment has a disadvantageous effect in the region of the flange connection. Moreover, in both of the known modes, the means of securement of the shock absorber leg is unsatisfactory, in that any tendency for loosening of the securing means used could cause the shock absorber leg to slide out of its mounting.

Accordingly, the present invention has been developed primarily, though not exclusively, with a view to providing an improved construction of vehicle suspension assembly, in the form of a swivel bearing for an axle unit, in which a shock absorber leg connection can be constructed with savings in material, and in processing and assembly costs, so as to result in a considerable reduction in costs over the known constructions. In addition, it should be possible for simply positioning and securement of a shock absorber leg in the assembly.

SUMMARY OF THE INVENTION

According to the invention there is provided a vehicle suspension assembly in the form of a swivel bearing for an axle unit and comprising:

a wheel bearing housing, a shock absorber leg connection and a hollow connecting element between the bearing housing and the shock absorber leg connection, in which:

the shock absorber leg connection comprises a substantially closed sleeve arranged to receive a shock absorber leg;

and fastening means extends transversely of the longitudinal axis of the sleeve and is operable to clamp the sleeve around the shock absorber leg when the latter is received by the sleeve.

A preferred embodiment of vehicle suspension assembly according to the invention will now be described in detail, by way of example only, with reference to the accompanying drawing.

DESCRIPTION OF THE PREFERRED EMBODIMENT

Figure 1:
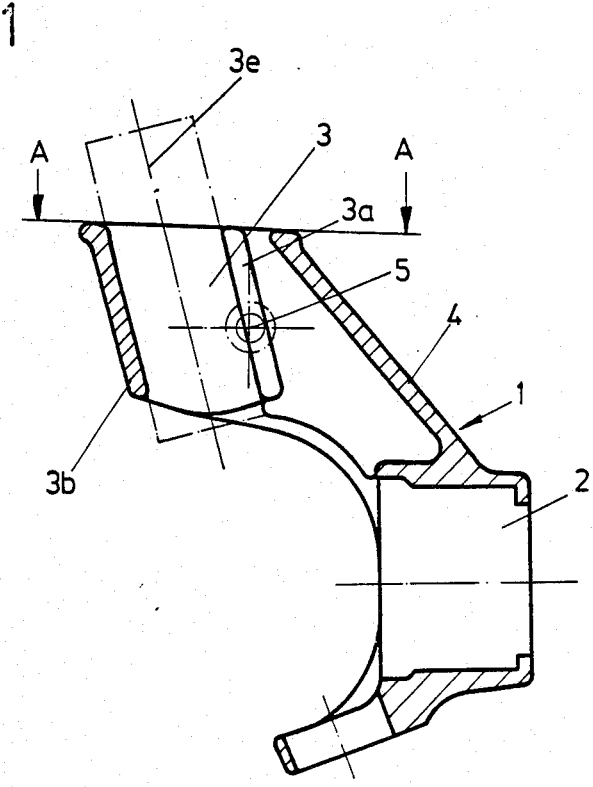
FIG. 1 is a longitudinal sectional view of a swivel bearing for an axle unit of a motor vehicle.

Referring now to the drawing, there is shown a vehicle suspension assembly in the form of a swivel bearing unit, designated generally by reference numeral 1, for an axle unit of a motor vehicle. The unit 1 comprises a wheel bearing assembly 2, a shock absorber leg connection 3 and a hollow connecting element 4 between the bearing housing 2 and the shock absorber leg connection 3. As will be seen from FIG. 1, the unit 1 is constructed somewhat in the manner of a bow. The unit is preferably produced as a one-piece casting with relatively thin walls, though it may also be formed by pressing from sheet metal.

The shock absorber leg connection 3 has a substantially closed shape, being made substantially in the form of a nearly closed sleeve (see FIG. 2) which merges with, or is integrated with the hollow connecting element 4. The opposite ends 3a and 3b of the sleeve 3 merge smoothly into the hollow connecting element 4 and the wheel bearing housing 2 respectively.

Figure 2:
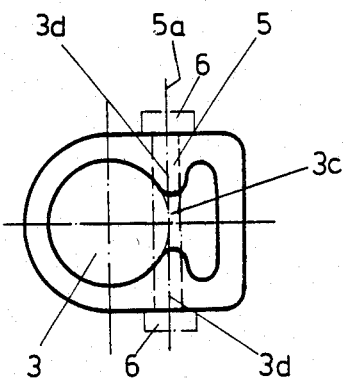
FIG. 2 is a plan view of a shock absorber leg connection of the unit shown in FIG. 1.

The construction of the shock absorber leg connection 3 is shown in more detail in the plan view of FIG. 2, though this does not show the shock absorber leg which will be received by the sleeve-form of the connection 3.

The wall of the sleeve-like connection 3 extends substantially, though not completely around the shock absorber leg, though a small peripheral clearance 3c remains. This clearance facilitates the reception, by the sleeve-like connection 3, of a tubular part of a shock absorber unit.

The shock absorber leg connection assembly includes securing or fastening means which extends transversely of the longitudinal axis of the sleeve and which is operable to clamp the sleeve around the shock absorber leg when the latter is received by the sleeve. The fastening means comprises a threaded fastener or screw 5 which is taken through the wall of the sleeve-like connection 3, substantially transversely, or perpendicularly of the longitudinal axis 3e of the sleeve. The screw 5 may be arranged to lie outside the outer periphery of the tubular part of the shock absorber unit received by the sleeve 3, or may be arranged so that its general longitudinal axis 5a forms a tangent with the tubular part. The screw 5 therefore also extends substantially tangentially of the sleeve-like form of the connection 3.

When the screw 5 extends substantially tangentially of the tubular part of the shock absorber unit, it divides the tubular part into two portions. To improve the locationing of the shock absorber leg in the sleeve, the tubular part may be provided with a notch which is engaged by the screw 5. This enables an exact positioning of the shock absorber leg to be made relative to the connection 3.

To secure the tubular part of the shock absorber in the connection 3, the screw 5 is tightened by means of the nuts 6 provided at opposite ends of the screw 5. Of course, one of the nuts 6 may be a normal screw head. However, it will be noted that both of the nuts 6 are located on the outside of the connection 3, and also externally of the hollow connection 4. Upon tightening of the screw 5, tongue-like projections 3d of the sleeve (which define the clearance gap 3c) are drawn towards each other, in order to exert a clamping action around the tubular part of the shock absorber. Therefore, tightening of the screw 5 places the shock absorber leg connection 3 under an initial (pre) pressure stress. This is advantageous with respect to known constructions, in which securing means therefor, provided with an outer screw mechanism, are placed under tensile pre-stress when the securing screws are tightened. Tensile pre-stress is much less favourable, with dynamic loads superimposition, as compared with initial compressive pre-stress.

As indicated above, it is preferred that the unit 1 shown in the drawing be made of a one piece casting, and the construction illustrated is particularly suitable for casting. In addition, the construction provides a design which is particularly adapted to the compact space normally available for suspension units of motor vehicles, which moreover makes possible savings in material and processing costs. Furthermore, an exact, speedy and reliable positioning of the tubular part of the shock absorber can readily be achieved. Moreover, even if there should be any possible loosening of the fastening means (screw 5), the tubular part will not fall out of the sleeve-like connection 3.

Additional positioning, and if necessary securing of the tubular part of the shock absorber may be provided by arranging sheet metal flaps, tongues, flanges or tabs, preferably by welding, onto the tubular part.

When the unit 1 is made as a one piece casting, it is preferred that it be made of suitable casting materials, particularly suitable examples being GGG (cast iron with nodular graphite/nodular graphite iron), GTS (all black malleable iron) and light metal alloys. However, as indicated above, the unit 1 may also be made as a sheet metal pressing.

Having thus described the invention, what we claim as new and desire to be secured by Letters Patent is as follows:

1. A swivel bearing, for use in connection with an axle unit and a shock absorber having a leg, of a vehicle suspension, comprising,
    a wheel bearing housing,
    engaging means adapted to engage a shock absorber leg, and
    a hollow, shaped connecting portion therebetween,
    said engaging means including a hollow sleeve adapted to receive said shock absorber leg, and
    clamping means operable to tighten said sleeve around the shock absorber leg when said leg is positioned in said sleeve, said clamping means comprising oppositely disposed internal projection formed integrally with said sleeve, said internal projections defining a gap therebetween and dividing said sleeve into a first substantially circular hollow portion adapted to receive said shock absorber leg, and a second hollow portion, said sleeve and clamping means forming an unbroken enclosure about said shock absorber leg.

2. A swivel bearing, as claimed in claim 1, made of pressed sheet metal.

3. A swivel bearing, as claimed in claim 1, made as a one-piece casting.

4. A swivel bearing, as claimed in claim 3, in which the one-piece casting is made of cast iron containing nodular graphite.

5. A swivel bearing, as claimed in claim 3, in which the one-piece casting is made of all black malleable iron.

6. A swivel bearing, as claimed in claim 3, in which the one-piece casting is made of a light-weight metal alloy.

7. A swivel bearing, as claimed in claim 1, further comprising fastening means associated with said clamping means, said fastening means operable to narrow the gap between said internal projections and thereby to tighten said sleeve around said shock absorber leg.

8. A swivel bearing, as claimed in claim 7, wherein said fastening means comprises a threaded fastener passing through said internal projections.

9. A swivel bearing, as claimed in claim 8, wherein said fastening means includes at least one tightening element arranged on the outside of said sleeve.

10. A swivel bearing, as claimed in claim 9, wherein the axis of said fastening means extends substantially tangentially relative to said sleeve.

11. In a vehicle suspension, including an axle unit and a shock absorber having a leg,
    in combination,
    a swivel bearing comprising a wheel bearing housing,
    engaging means adapted to engage a shock absorber leg, and
    a hollow, shaped connecting portion therebetween,
    said engaging means including a hollow sleeve adapted to receive said shock absorber leg, and
    clamping means operable to tighten the sleeve around the shock absorber leg when said leg is positioned in said sleeve, said clamping means comprising oppositely disposed internal projections formed integrally with said sleeve, said internal projections defining a gap therebetween and dividing said sleeve into a first substantially hollow portion adapted to receive said shock absorber leg, and a second hollow portion, said sleeve and clamping means forming an unbroken enclosure around said shock absorber leg.

* * * * *